United States Patent

[11] 3,600,499

[72] Inventor David Arthur Hibbs
 Chandlers Ford, England
[21] Appl. No. 2,313
[22] Filed Mar. 27, 1970
[45] Patented Aug. 17, 1971
[73] Assignee International Standard Electric Corporation
 New York, N.Y.
[32] Priority Apr. 2, 1969
[33] Great Britain
[31] 17,320/69

[54] JOINT BETWEEN A SUBMARINE COAXIAL ELECTRICAL CABLE AND A REPEATER TAIL CABLE AND METHOD OF MAKING SAME
 5 Claims, 1 Drawing Fig.
[52] U.S. Cl. .................................................... 174/70 S,
 29/628, 174/88 C
[51] Int. Cl. .................................................... H02g 15/14
[50] Field of Search .......................................... 174/70 S,
 75 C, 88 C, 89; 29/628

[56] References Cited
UNITED STATES PATENTS
3,349,163 10/1967 Rocton .......................... 174/70 S
3,454,707 7/1969 Langmack et al. ............ 174/70 S Primary Examiner—Laramie E. Askin
Attorneys—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

ABSTRACT: An end of a submarine coaxial cable is joined to an end of a repeater tail coaxial cable by replacing the free end of the aluminum outer conductor of the submarine coaxial cable with an aluminum alloy braid sheath, welding the sheath to the aluminum outer conductor, and fitting a composite water barrier assembly into the inner insulation at the free end of the submarine cable. The assembly comprises a copper alloy castellated sleeve, an aluminum alloy end piece friction welded to the castellated sleeve, and a high strength copper alloy liner. The aluminum alloy end piece is welded to the braided sheath, and the castellated sleeve is joined to the copper braid of the outer conductor of the repeater coaxial tail cable.

PATENTED AUG 17 1971
3,600,499
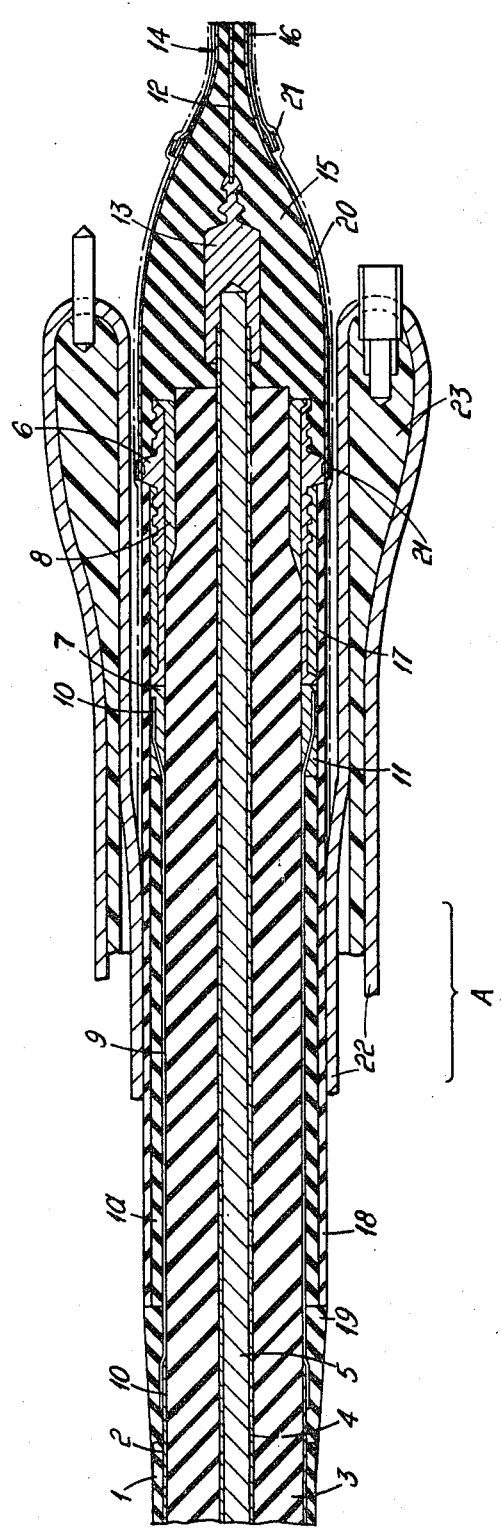
Inventor
DAVID A. HIBBS
By Edward Goldberg
Attorney

3,600,499

JOINT BETWEEN A SUBMARINE COAXIAL ELECTRICAL CABLE AND A REPEATER TAIL CABLE AND METHOD OF MAKING SAME

BACKGROUND OF THE INVENTION

1. Field of the Invention

This invention relates to a method of and means for connecting two cable sections and, more particularly, for connecting an end of a submarine coaxial electrical cable to an end of a repeater tail cable.

2. Description of the Prior Art

Known methods utilize cold-pressure welding techniques between the aluminum conductors of submarine coaxial electric cables and the conductors of repeater tail cables, which result in joints which are unsuitable for cable transmission frequencies of 5 to 12 MHz., and which are inflexible. This inflexibility is undesirable as the termination must be able to withstand repeater launch conditions.

SUMMARY OF THE INVENTION

It is therefore the object of the invention to provide a method of and means for converting coaxial cable ends to form an improved more flexible joint.

According to the present invention, the aluminum outer conductor of a submarine coaxial cable is terminated and joined to the copper braid outer conductor of a repeater tail cable, by replacing the aluminum outer conductor at the cable end by an aluminum alloy braid sheath, welding the sheath to the aluminum outer conductor, and joining the sheath to the copper braid outer conductor by means of a composite water barrier assembly fitted onto the inner insulation at the free end of the submarine coaxial cable. The assembly includes a copper alloy castellated sleeve, an aluminum alloy end piece friction welded to the sleeve, and a high-strength copper alloy liner. The end piece is welded to the braid sheath, and the copper braid outer conductor of the repeater tail cable is joined to the castellated sleeve of the water barrier assembly.

An embodiment of the invention will now be described with reference to the accompanying drawing.

BRIEF DESCRIPTION OF THE DRAWINGS

The FIGURE shows a sectional view of a joint between a coaxial submarine electric cable and a repeater tail cable.

DETAILED DESCRIPTION OF THE INVENTION

The first step in the manufacture of this type of joint is the slipping of an oversheath tube 18 onto the free submarine cable end, which end is then prepared as follows. The outer sheath 1 is split and removed from the end portion of the cable, and the aluminum outer conductor 2 is removed from this portion such that there remains a small piece of the conductor 2 extending from under the remaining outer sheath 1. At the free end of the cable a portion of the inner insulation 3 is removed, in order to bare the inner conductor 4. A portion of the inner conductor 4 is then removed in order to bare the stranded cable core 5. The inner insulation 3 is then tapered at the free end of the cable.

A composite barrier tube and braid assembly is then formed as follows. An outer castellated sleeve 6 made of a copper alloy for ease of jointing to the copper tail cable braids 20 and having a high-strength copper alloy liner 8, is friction welded to an end piece 7 which is made of an aluminum alloy for ease of joining to an aluminum alloy braid sheath 9. The braid sheath 9 is then placed in overlapping relationship with the end piece 7, an aluminum sleeve 10 placed around the overlap, and argon spot welding used to make the joint between them.

The barrier tube and braid assembly is then slid over the prepared cable end, together with a packing piece 11, to adopt the position shown in the drawing with the braid 9 overlapping the outer conductor 2. An aluminum sleeve 10 is then placed around the overlap, and argon spot welding used to make the joint between them.

The portion of the outer sheath 1 which was removed is then shortened in length and placed as 1a over the braid 9. The oversheath tube 18 is pushed over the sheath 1a to adopt the position shown in the drawing, and sealed to the outer sheath 1 by means of a moulded joint 19.

The inner conductor 12 of the repeater tail cable is bared, and braced into one end of a copper ferrule 13 which acts as an interlayer slip stop. The outer conductor 14 comprising two layers of copper braid 16 is fanned out. The inner conductor 4 and the stranded core 5 of the main cable are then swaged into the other end of ferrule 13. Dielectric is moulded to the shape as shown at 15 between the inner insulation of the repeater tail cable and the largest castellation of sleeve 6, and around the barrier tube assembly at 17. This largest castellation is castellated circumferentially as well as axially so that the moulded dielectric is continuous between portions 15 and 17.

A double braid copper covering 20 is then formed over the dielectric 15, such that it is overlapped by the braid 14, and overlaps the largest castellation on sleeve 6. Strips of copper 21 are formed around both ends of covering 20, and argon spot welding is used to make the joints. A plastic tape, indicated by the broken line, is wrapped around the outer sheath 18 and the covering 20 to hold the braids tightly to the insulation in order to provide good coaxial connection.

The main cable end is then armored in a suitable known manner. The cable end shown in the drawing has armoring 22 and a cone anchorage 23. This cone anchorage 23 transfers the cable laying stresses from the stranded core 5 to the repeater housing, not shown. The cable has to be flexible in a region under the end of the cone 23 in order to withstand repeater launch conditions. This flexibility is provided by the braid sheath 9; the area of flexibility being shown in the drawing at A.

In a preferred embodiment the sleeve 6 is made of a copper-nickel-silicon alloy, the end piece 7 and braid sheath 9 are made of an aluminum-magnesium alloy, and the liner 8 is made of a beryllium-copper alloy.

It is to be understood that the foregoing description of specific examples of this invention is not to be considered as a limitation of its scope.

I claim:

1. A coaxial cable connection joining one coaxial cable to another coaxial cable comprising:
   inner and outer conductors for each cable, an end portion of the outer conductor of one cable being removed;
   a conductive braided sheath disposed around the end in place of said removed portion, one end of said sheath being welded to the outer conductor;
   an insulation layer surrounding the inner conductor of said one cable;
   a composite water barrier assembly fitted around said insulation layer; said assembly including a conductive tube, an end of said tube being welded to the other end of said braided sheath, and a conductive castellated sleeve, an end of said sleeve being friction welded to the other end of said conductive tube;
   an outer conductive means connecting the other end of said castellated sleeve to the outer conductor of said other cable;
   an inner conductive means connecting an end of said inner conductor of said one cable to the inner conductor of said other cable; and
   dielectric means disposed between said inner and outer conductive means.

2. A cable connection in accordance with claim 1 wherein said outer conductor of said other cable includes a copper braid.

3. A cable connection in accordance with claim 2 wherein said castellated sleeve is made of a copper-nickel-silicon alloy and said conductive tube and braided sheath are made of an aluminum-magnesium alloy.

4. A cable connection in accordance with the claim 3 wherein said connection further includes a high-strength conductive liner made of a beryllium-copper alloy interposed between said castellated sleeve and said insulation surrounding said inner conductor of said one cable.

5. A method of terminating the aluminum outer conductor of a submarine coaxial cable and joining it to the copper braid outer conductor of a repeater tail cable, comprising the steps of:

removing a portion of the aluminum outer conductor at the end of said coaxial cable and replacing said portion with an aluminum alloy braid sheath;

welding said aluminum alloy braid sheath to said aluminum outer conductor;

fitting a composite water barrier assembly into the inner insulation at the free end of said submarine cable, said assembly including a copper alloy castellated sleeve, an aluminum alloy end piece friction welded to said castellated sleeve, and a high-strength copper alloy liner;

welding said aluminum alloy end piece to said aluminum alloy braid sheath; and joining said castellated sleeve to said copper braid of the outer conductor of said repeater tail cable.